United States Patent Office 3,542,661
Patented Nov. 24, 1970

3,542,661
RADIATION CURABLE, GLASS FIBER FILLED
POLYVINYL CHLORIDE COMPOSITIONS
Oskar E. Klopfer and Edwin D. Hornbaker, Baton Rouge,
La., assignors to Ethyl Corporation, New York, N.Y., a
corporation of Virginia
No Drawing. Filed Mar. 7, 1968, Ser. No. 711,229
Int. Cl. G08f 1/24
U.S. Cl. 204—159.17                              13 Claims

ABSTRACT OF THE DISCLOSURE

A cross-linked, reinforced, heat-stable vinyl halide resin and a process for preparing said resin comprising irradiating a mixture of (A) a polyvinyl halide, (B) a polyunsaturated monomer, and (C) a reinforcing quantity of chopped glass fibers. Resultant cured, reinforced polyvinyl halide resins have heat deflection temperatures in excess of 90° C. when irradiated at dose levels of at least 1.0 megarad.

BACKGROUND OF THE INVENTION

Field of the invention

This invention relates to rigid, reinforced, cross-linked polyvinyl halide resins. More particularly, the invention is concerned with irradiation cross-linking polyvinyl halide resins having incorporated therein glass fibers and certain polyfunctional allyl and vinyl monomers.

Description of the prior art

Vinyl halide resins, for example, polyvinyl chloride, are used extensively as insulation for electrical conductors and other potentially high temperature applications. However, there are a number of applications where resistance to elevated temperatures is a requirement which the thermoplastic vinyl halide resins cannot satisfy. This is due to the fact that rigid vinyl halide compounds begin to soften and readily deform or decompose under load usually in the range of 80 to 125° C. This is equivalent to a standard heat deflection temperature range of from about 65° to 75° C. under a load of 264 p.s.i.

In an effort to make polyvinyl halide resins more resistant to these temperatures, many attempts have been made to effect cure or cross-linking of the resins. U.S. Pat. 3,351,604, issued Nov. 7, 1967, describes several of these attempts and in turn discloses yet another method for this purpose. The patent describes the use of certain plasticizers in admixture with polyvinyl halide and triallyl cyanurate, in certain cases in the presence of a peroxide initiator. Curing was effected by the use of heat when peroxides were present or high energy ionizing radiation in their absence. Irradiation was conducted using from 50,000 electron volts to 20,000,000 electron volts or higher. The patentees discovered that other polyfunctional coreactants similar to the triallyl cyanurate were not effective when employed in the invention.

U.S. Pat. 3,125,546, issued Mar. 17, 1964, discloses high temperature curing of a substantially linear polymer with a minor portion of a polyfunctional allyl monomer in the presence of a free radical polymerization initiator. Typical polymers of the invention are polyethylene, polypropylene, natural rubber, cellulose acetobutyrate, cellulose acetate and polyvinyl chloride (PVC). Some of the polymers were irradiated at a dose level of about 20 megarads in order to effect a cure of the polymeric resin.

While reinforcing polymeric resins with glass fibers is relatively old in the art, it is not known that substantially increased heat deflection temperatures are possible by applying this technique to amorphous plastics. In fact, reinforcement of amorphous plastics (such as polyvinyl chloride) usually gives only a small improvement in deflection temperature. Glass fiber reinforcement of such resins is generally done in order to obtain increases in tensile or impact strengths of the resins. However, when this is accomplished, other beneficial and desirable properties must be sacrificed.

One of the most important advantages to be derived from curing or cross-linking glass fiber reinforced PVC is the maintenance of dimensional stability at elevated temperatures. This is generally measured in terms of heat deflection temperature. The maintenance or improvement of desirable properties, such as tensile strength, modulus, impact and elongation, while important, is secondary to the principal aim of maintaining the dimensional stability of plastic products at elevated temperatures. The primary goal in this approach is to maintain dimensional stability while retaining as many as possible of other desirable properties in the resultant cured polymer.

These and related problems are overcome by the present invention, which is more fully described in the following specification and claims.

SUMMARY OF THE INVENTION

A cross-linked, reinforced, heat-stable vinyl halide resin composition of matter comprising (A) 100 parts by weight of a vinyl halide resin selected from the class consisting of homopolymers of vinyl halides and copolymers of a major portion of a vinyl halide with an ethylenically unsaturated monomer copolymerizable therewith, (B) from about 10 to about 50 parts by weight of a polymerized polyfunctional unsaturated monomer, and (C) from about 5 to about 100 parts by weight glass fibers; said cross-linked resin having become cross-linked by high energy irradiation at a dose level of at least 1.0 megarad, to produce a cured polyvinyl halide resin having a heat deflection temperature in excess of 90° C.

More specifically the composition of matter comprises (A) 100 parts by weight of a vinyl halide resin; (B) from about 10 to about 50 parts by weight of a polymerized polyfunctional unsaturated monomer selected from the group consisting of polyol polymethacrylates, polyallyl isocyanurates, polyallyl alkyl isocyanurates, polyallyl aromatic isocyanurates, polyallyl cyanurates, polyallyl polycarboxylates and polyvinyl aromatics; and (C) from about 5 to about 100 parts by weight glass fibers.

It has been discovered that the above composition may be prepared by mixing the polyvinyl halide resin, polyfunctional unsaturated monomer and glass fibers by standard techniques and at conventional polyvinyl halide processing temperatures. The reinforced polyvinyl halide compound may then be formed into any desired shape before being irradiated. The polyvinyl halide compositions are suitable for extrusion, calendaring or injection molding. The finished product is subsequently cured by directing high energy electron beam irradiation upon the shaped products. Thus, the need for special shaping and forming equipment is eliminated, avoiding possible polymer degradation by application of the high temperatures to the polyvinyl halide resin otherwise necessary to cause cross-linking.

DESCRIPTION OF THE PREFERRED EMBODIMENTS

The vinyl halide resins employed in the practice of this invention may be either the homopolymer or copolymer of a major portion of a vinyl halide with an ethylenically unsaturated monomer copolymerizable therewith. Among the polyvinyl halides suitable for the invention are polyvinyl chloride, polyvinyl fluoride and polyvinyl bromide. The most preferred polyvinyl halide is polyvinyl chloride.

Suitable ethylenically unsaturated monomers copolymerizable with vinyl chloride are the alpha olefins, such as ethylene. A particularly suitable vinyl chloride-ethylene copolymer contains from about 0.5 to about 12 weight percent ethylene. In addition, vinyl esters of lower saturated aliphatic monocarboxylic acids containing up to about 6 carbon atoms are equally suitable as comonomers. Suitable among the vinyl esters are vinyl acetate, vinyl propionate, vinyl hexanoate, and the like. A particularly suitable vinyl ester is vinyl acetate.

There are many other suitable monomers copolymerizable with vinyl halides such as vinyl chloride. These are exemplified by the vinyl alkyl ethers. Some of the vinyl alkyl ethers useful in the present invention are vinyl ethyl ether, vinyl propyl ether, vinyl cetyl ether and the like. Generally, the alkyl group present in the vinyl ether may have up to about 20 carbon atoms. Vinyl cetyl ether is particularly suitable in the present invention.

The most preferred vinyl halide resin useful in the present invention is polyvinyl chloride (PVC). The PVC may be prepared by conventional polymerization processes, such as suspension, solution and bulk. However, suspension resins are especially useful in preparing the rigid, reinforced, cross-linked resins of the invention. Particularly useful PVC resins sold commercially are "SM–250," "SM–225," "SM–200," and "SM–175," suspension PVC resins (sold by Ethyl Corporation). Other commercial PVC resins of this type are equally suitable.

The polyfunctional unsaturated monomers that are useful in the invention may be selected from the group consisting of polyol polymethacrylates, polyallyl isocyanurates, polyallyl alkyl isocyanurates, polyallyl aromatic isocyanurates, polyallyl cyanurates, polyallyl polycarboxylates, and polyvinyl aromatics. These monomers may be used at a level of from about 10 to about 50 parts by weight per hundred parts by weight of PVC resin (phr.). Preferably, the monomers should be added in an amount ranging from 10 to about 25 phr. Actually, it is permissible, and within the scope of the invention to employ more than 50 phr. monomer, but the vast advantage of the present invention resides in the significant improvement of properties using the lower amounts of monomer.

Typical examples of polyol polymethacrylates are tetramethylene glycol dimethacrylate, triethylene glycol dimethacrylate, ethylene glycol dimethacrylate, polyethylene glycol dimethacrylate, trimethylolpropane trimethacrylate, trimethylolethane trimethacrylate, glycerol trimethacrylate, pentaerythritol tetramethacrylate, dipentaerythritol hexamethacrylate, sorbitol hexamethacrylate, and 2,2,4-trimethyl-1,3-pentanediol dimethacrylate.

The most preferred polyol polymethacrylates are ethylene glycol dimethacrylate, trimethylolpropane trimethacrylate and pentaerythritol tetramethacrylate. The most preferred of these three compounds is trimethylolpropane trimethacrylate.

Suitable polyallyl alkyl and aromatic isocyanurates are diallyl methyl isocyanurate, diallyl ethyl isocyanurate, and the like, the alkyl radical having up to about 8 carbon atoms. Diallyl phenyl isocyanurate is also suitable in the present invention. In addition to these, triallyl isocyanurate is quite satisfactory, and is one of the more preferred monomers.

Suitable polyallyl cyanurates are diallyl methyl cyanurate, diallyl ethyl cyanurate, diallyl propyl cyanurate, and the like, the alkyl moieties having up to about 8 carbon atoms. Diallyl phenyl cyanurate has been found to be an acceptable monomer for use in the present invention.

Advantageously, economies in practicing the invention may be realized by employing polyallyl polycarboxylate monomers either alone or in combination with the other monomers taught herein. Suitable polyallyl polycarboxylates are diallyl phthalate, diallyl sebacate, diallyl adipate, triallyl trimesate, triallyl trimellitate, tetraallyl pyromellitate, triallyl citrate, and the like. More preferred polycarboxylates are diallyl phthalate, dially sebacate, and triallyl citrate. Of these, the most preferred monomer is diallyl phthalate.

The polyallyl polycarboxylate monomers are especially beneficial when used in conjunction with other monomers, such as trimethylolpropane trimethacrylate, triallyl isocyanurate, triallyl cyanurate, and the like. This conjoint use of monomers in the invention is most advantageous when diallyl phthalate is used in mixture with a monomer such as trimethylolpropane trimethacrylate or triallyl isocyanurate. Acceptable results have been obtained using up to about 80 weight percent, based on total monomers, of the polyallyl polycarboxylate.

Other suitable monomers are polyvinyl aromatics, such as, divinyl benzene, divinyl naphthalene and divinylbiphenyl, as well as, certain polyacrylates, such as, ethylene glycol diacrylate, triethylene glycol diacrylate, tetraethylene glycol diacrylate, trimethylolpropane triacrylate, trimethyolpropane triacrylate, glycerol triacrylate, pentaerythritol tetraacrylate, and the like.

Generally, the allyl and methallyl acrylates or methacrylates are equally suitable in practicing the invention. Exemplary of these monomers are methallyl acrylate, methallyl methacrylate, allyl acrylate and allyl methacrylate.

The monomer is mixed with the polyvinyl halide in an amount ranging from about 10 to about 50 parts per hundred parts of polyvinyl halide resin (phr.), on a weight basis. Most satisfactory cured resins are obtained when the mixture contains from about 10 to about 30 phr. of the coreactant.

The glass fiber reinforcement employed in the present invention may be any commercial product available on the market. Either monofilament or multifilament glass fibers may be used. Several were tested and found to be equally suitable. These included both treated and untreated glass fibers. Suitable representatives of the glass fiber products available are "HR 3129" (Pittsburgh Plate Glass Co.), "CS 308A" (Johns-Manville Corp.), "OCF 885 A" (Owens-Corning Corp.), and "Roll Glass" (Owens-Corning), the latter being untreated.

For use in the invention, the glass fibers should be less than one inch in length, and preferably about one-fourth inch. The manner in which the glass fibers are blended with the resin is given below.

In addition to using the glass fibers alone, other reinforcing agents and filler materials may be employed in conjunction therewith. Typically, the glass fibers are blended in an equal amount with another reinforcing agent or filter material such as a silicate, carbonate, asbestos, carbon black or other material.

Materials that have been found to be acceptable are Cabosil (Cabot Corporation), Silica of millimicron size; microspheroidal silica gel; and carbon black. In addition, there are several commercially available materials made by coating calcium carbonate with fatty acid calcium salts which have been found to be especially useful in the present invention. When these compounds are used in the invention, it may be advantageous to employ any of several available bonding agents. A particularly good bonding agent for this purpose is $\gamma$-aminopropyltriethoxysilane, available commercially as "A–1100" (Union Carbide).

Various stabilizers and lubricants may be blended with the polyvinyl halide resins, depending upon choice of resin and end use contemplated for the cured product. It has been found that the presence or absence of these materials have very little effect upon the curing of the polyvinyl halide.

The stabilizers which have been found useful in the present invention are Dyphos (National Lead Company), a dibasic lead phosphite; tert-butylcatechol; Thermolite T–31 (Metal and Thermite Chemical Co.), a dibutyl tin dithiol glycolate; and Thermolite T–73 (M and T Chem.) a dialkyl tin mercaptide derivative. Other stabilizers known to be useful with PVC compounds are also generally acceptable for the compositions of the invention.

Lubricants are sometimes useful in certain PVC compounds, and the same principles apply to the present invention. A particularly useful lubricant in the resin blend is stearic acid. Other lubricants that have been found advantageous are calcium stearate; N,N'-distearylethylene diamine, sold commercially as Advawax 280 (Advance Division, Carlisle Chemical Works, Inc.); glycerol monostearate; sodium stearate; and aliphatic esters of montanic acid.

The irradiation source for curing the polyvinyl halide resins may be any conventional supply of high energy electrons. Preferred dose levels are in the range of from 1.0 to about 15 megarads. However, it is particularly advantageous to use irradiation doses of from about 2.5 to about 10.0 megarads. Especially satisfactory results are achieved using a dose level of from about 5.0 to about 10.0 megarads.

It was discovered that an optimum range of irradiation exists within which good resin curing is achieved. Irradiation below or above this range produced heat deflection temperatures (DT) which were not satisfactory. There was observed a loss in DT's as this optimum range of irradiation was exceeded, thus, establishing a need for rather careful control of total irradiation to be received by the resin products.

According to the invention, the polyvinyl halide is blended with the glass fiber and polyfunctional allyl or vinyl monomer, which has previously been thoroughly mixed together. The polyvinyl halide is preferably in powder form an is easily blended with the mix of glass and monomer. Thereafter, the fillers, if used, and sensitizers and stabilizers, etc. are next blended with the resin mix. This blend is subsequently heated to the proper temperature for forming shaped articles or profiles. The compounds of the invention may be formed into useful articles and shapes by extrusion, calendering or injection molding. The finished articles or shapes may then be cured by irradiation at the convenience of the producer of the articles and shaped profiles.

Extrusion of the polymer compounds of the invention may be accomplished by standard techniques and equipment known in the art. Since the compounds are cross-linked after product formation, there is no need for exceptionally high-temperature, high-shear extrusion equipment. As a result, there is less chance of polymer degradation from excessive temperatures used in product formation. Extrusion may be used in forming pipes, molding, and other profile shapes. Banbury mixers have been found to be especially useful in preparing compounds of the invention.

The polymer compounds of the invention may be shaped into useful articles by calendering and injection molding techniques. Thus, it is possible to form sheets, rods, bars and specially designed pieces having exceptionally good dimensional stability by utilizing either of these methods.

PREPARATION OF THE SAMPLES FOR IRRADIATION

Although several methods were found to be suitable in mixing the glass fibers with the polyvinyl halide, two of these were discovered to be particularly advantageous.

The first method comprises dispersing the polyfunctional monomer on the glass fibers by means of mechanical agitation in a Hobart mixer or by hand using a spatula. Next, the polyvinyl halide resin, stabilizer and lubricant are added to the glass fiber mixture while the mixer is providing continuous agitation of the ingredients. The mixer is turned off after a uniform blend is obtained. This method produces a "dry mix" of the primary ingredients to be used in an extrusion or calendering process.

An alternate method comprises blending the polyvinyl halide resin, stabilizer, lubricant and polyfunctional allyl or vinyl monomer in a mixing device, such as a Hobart mixer, and subsequently adding the glass fibers, and filler if used, when the resin mix is in the roll mill. Necessarily, the polymer resin is usually in the fused state when the glass fibers are added thereto.

Injection molding techniques are equally suitable in preparing samples for cross-linking. Additional suitable methods of preparing the compounds of this invention by using a screw extruder are disclosed in U.S. Pat. 3,164,563 and Canadian Pats. 750,283 and 758,934. A commercial extruder that is useful in practicing the invention is a Prodex extruder.

About 0.1 phr. on a weight basis, tert-butylcatechol was employed in the examples as a stabilizer. Other known stabilizers are equally suitable in the invention. For example, about 5 phr. of Dyphos (National Lead Company), a dibasic lead phosphite, is employed as a heat stabilizer in the invention. In addition, the monomethyl ether of hydroquinone is useful as a color stabilizer.

The dry blends were milled on a 350° F. hot two-roll mill to form a sheet from which test pieces of 6 x 6 x 1/8 inch were molded at a platen temperature of 350° F. For the determination of heat deflection temperatures (DT), these were cut into 6 x 1/2 x 1/8 inch test bars which were then irradiated.

The irradiation of the samples was carried out using a 1.5 mev. Dynamitron electron accelerator (Radiation Dynamics, Inc.). The samples were treated in air with dose levels of 1.0, 2.5, 3.75, 5.0, 6.25, 7.5 and 10.0 megarad.

All samples prepared according to the invention were tested for deflection temperature under load by the method set forth is ASTM D648-56 (1961) using 264 p.s.i. fiber stress. This test measures the temperature at which the test bar of resin is deflected 0.25 mm. (0.010 inch) while under constant load.

The tensile properties of the cured resins were determined according to testing methods described in ASTM D638-64T. This method is used in determining the comparative tensile properties of plastics in the form of standard test specimens and when tested under defined conditions of pretreatment, temperature, humidity, and testing machine speed. The speed of testing in this series of experiments was (Speed B) 0.51 to 0.64 cm. (0.20 to 0.25 inch) per minute. Tensile strength, percentage elongation and elastic modulus are all described in this test.

EXAMPLE 1

The test specimens were prepared by the first method, described above, and contained 100 parts by weight of "SM-225" PVC suspension resin (Ethyl Corporation), 12.5 phr. trimethylolpropane trimethylacrylate and 39.45 phr. glass fiber "HR-3129" (Pittsburgh Plate Glass Company). The glass is present in the formulation at a 25 weight percent level. The PVC was stabilized with 5 phr. Dyphos (National Lead Company), a dibasic lead phosphite, and lubricated with 0.75 phr. stearic acid.

Deflection temperatures (DT) were measured on samples that had been irradiated at (a) zero, (b) 3.75, (c) 5.0, (d) 6.25, and (e) 7.5 megarads. The unirradiated sample had a DT of less than 30° C., while samples (b) through (e) had DT's of at least 170° C. (the highest temperature attainable with the measuring instrument).

Impact resistance was determined according to the standard method ASTM D256-56 (1961), Method A (Izod Type). The test specimen (c) was found to have an Izod impact strength of 5.0 foot-pounds per inch of notch.

EXAMPLE 2

The procedure and formulation of Example 1 was repeated, increasing the trimethylolpropane trimethacrylate and glass fiber content to 50 phr. and 51.75 phr., respectively. However, the total glass fiber content was maintained at 25 weight percent in the formulation. The specimens were irradiated at the Example 1 dose levels and found to have a DT of at least 170° C. Izod impact strength of the test piece irradiated with 5.0 megarads was 5.2 foot-pounds per inch of notch (ft.-lbs. per inch of notch).

EXAMPLE 3

The procedure of Example 1 was followed in preparing test specimens containing 100 parts by weight "SM–225" PVC suspension resin (57.4 weight percent), 25 phr. trimethylolpropane trimethacrylate (14.3 weight percent), and 43.5 phr. "CS 308A" glass fiber (Johns-Manville).

The test specimens were irradiated at the same dose levels used above and had DT's ranging from 157° C. up to 170° C. The maximum DT was achieved on the specimen irradiated at a dose level of 6.25 megarad. Impact strengths of the test pieces were high.

EXAMPLE 4

Test specimens were prepared according to the method of Example 1 using 100 parts by weight "SM–225" PVC resin, 25 phr. trimethylolpropane trimethacrylate, and 43.5 phr. "Roll glass" (Owens-Corning), which is an uncoated glass fiber.

The specimens were irradiated in the same manner as those in the previous examples. Deflection temperatures ranged from 123° C. for the specimens irradiated at 5.0 megarad, up to 170° C. for the specimens irradiated at the higher dose levels. Izod impact strength remained the same as in the previous examples.

EXAMPLE 5

An alternative method of blending the glass fiber with the polymeric resin was employed in preparing the test specimens in this example. 77.5 phr. "HR–3129" glass fiber was added to the PVC-polyfunctional monomer blend on a hot roll mill maintained at 350° F. Present in the resin mix were 100 parts by weight "SM–225" PVC resin (45.2 weight percent) and 37.5 phr. trimethylolpropane trimethacrylate (17.0 weight percent). The higher level of glass used herein raised the weight percent of glass in the formulation to 35, compared with 25 in the previous examples.

The test specimens were irradiated at the same dose level as in Examples 1–4, and deflection temperatures determined. All irradiated specimens had a deflection temperature of 170° C., and the specimen irradiated at 5.0 megarads had an Izod impact strength of 4.5 foot-pounds per inch of notch.

EXAMPLE 6

The mixing procedure of Example 1 was used in preparing test specimens containing 100 parts by weight "SM–225" PVC suspension resin, 25 phr. diallyl phthalate (14.2 weight percent), and 43.5 phr. "HR–3129" glass fiber (24.9 weight percent).

The specimens were irradiated at (a) zero, (b) 2.5, (c) 5.0, (d) 7.5, and (e) 10.0 megarad. Deflection temperatures and Izod impact strength values were determined on the test pieces. The DT of specimen (a) was less than 30° C., while specimens (b) through (e) had DT's in the range of about 95° to 160° C. Izod impact strength was 3.7 foot-pounds per inch of notch.

EXAMPLE 7

The procedure of Example 6 in preparing and testing test specimens was employed for a formulation containing:

100 parts by weight PVC suspension resin
50 phr. triallyl isocyanate
51.75 phr. "HR–3129" coated glass fiber DT of the specimens was 170° C., with the Izod impact strength ranging from 5.0, for the 10.0 megarad sample, up to 6.1 foot-pounds per inch notch, for the 7.5 megarad sample.

EXAMPLE 8

In order to compare the deflection temperature results of the cured glass fiber filled PVC resin with the same cured resin without glass fiber, Example 7 was repeated omitting the glass fiber therefrom. Deflection temperature was determined for the irradiated samples and was found to range from 90° C. to 92° C., which is substantially below the 170° C. DT of the glass fiber reinforced specimens of Example 7.

EXAMPLE 9

In applications where deflection temperature standards are not as high as the glass fiber reinforced resins are capable of satisfying, quite satisfactory results are obtained employing a mixture of glass fiber and other filter material. This was demonstrated in a formulation containing 100 parts by weight "SM–225" PVC suspension resin. 50 phr. trimethylolpropane trimethacrylate, 26.75 phr. "HR–3129" glass fiber, and 25.0 phr. microspheroidal silica gel. The total amount of filler and glass fiber was maintained at 25 weight percent in the formulation.

Irradiation of the test specimens was at the same levels as in Example 1, resulting in a cured resin having deflection temperatures ranging from about 140° C. up to 170° C. Izod impact strength was somewhat reduced in comparison to formulations containing only glass fiber as a filler and reinforcing agent. However, the impact strengths of these specimens were well above the 0.5 foot-pound per inch of notch value of uncured, unreinforced PVC resin.

EXAMPLE 10

In a manner similar to Example 9, a series of test specimens were prepared containing only 25 phr., on a weight basis, of trimethylolpropane trimethacrylate with 100 parts by weight PVC suspension resin. In addition to adding to the resin blend 22.0 phr. "HR–3129" glass fiber, there was also added 22.5 phr. "Omya BSH," a $CaCO_3$ coated with fatty acid calcium salts (Pluess-Stauffer, Inc.). The irradiated specimens observed to have a maximum DT of 170° C., and Izod impact strengths were comparable to those obtained in the other examples.

EXAMPLE 11

The procedure of Example 8 was repeated except that 50 phr. trimethylolpropane trimethacrylate was used in place of the triallyl isocyanurate. The irradiated, unreinforced test pieces and deflection temperatures ranging from 90° C. up to 96° C., while the unirradiated, unreinforced PVC resin had a DT of less than 30° C.

The vast increase in load bearing capabilities at high temperatures provides the polyvinyl halide resins of the invention wide applicability in pipe extrusions for high temperature applications. This area of use for polyvinyl chloride pipe, particularly, has been denied in the past due to the tendency of polyvinyl chloride to deform at the higher temperatures. In addition, polyvinyl chloride cured by the present methods has utility as rigid sheeting material in the building and construction trade.

We claim:

1. A cross-linked, reinforced, heat stable vinyl halide composition of matter comprising: (A) 100 parts by weight of a vinyl halide resin selected from the class consisting of homopolymers of vinyl halides and copolymers of a major portion of a vinyl halide with an ethylenically unsaturated monomer copolymerizable therewith, (B) from about 10 to about 50 parts by weight of a polyfunctional unsaturated monomer selected from the group consisting of polyallyl isocyanurates, polyallyl alkyl isocyanurates, and polyallyl aromatic isocyanurates, and (C) from about 5 to about 100 parts by weight glass fiber; said cross-linked composition being cross-linked by high energy irradiation at a dose level of at least 1.0 megarad, to produce a polyvinyl halide composition having a heat deflection temperature in excess of 90° C.

2. The composition of claim 1 wherein the vinyl halide resin is polyvinyl chloride homopolymer.

3. The composition of claim 1 wherein the vinyl halide composition of matter comprises: (A) 100 parts by weight polyvinyl chloride homopolymer and (B) from about 10 to about 50 parts by weight irradiation polymerized triallyl isocyanurate.

4. The composition of claim 1 wherein the polyfunctional unsaturated monomer comprises a mixture of at least two of said monomers, one of which is diallyl phthalate, the other being selected from the group consisting of polyallyl isocyanurates, polyallyl alkyl isocyanurates, and polyallyl aromatic isocyanurates.

5. The composition of claim 4 wherein the mixture comprises from about 10 to about 80 weight percent diallyl phthalate and about 90 to about 20 weight percent triallyl isocyanurate.

6. A process for preparing a reinforced, cross-linked, heat-stable vinyl halide composition comprising intimately mixing (A) 100 parts by weight of a vinyl halide resin selected from the class consisting of homopolymers of vinyl halides and copolymers of a major portion of a vinyl halide with an ethylenically unsaturated monomer copolymerizable therewith, (B) from about 10 to about 50 parts by weight of a polyfunctional unsaturated monomer selected from the group consisting of polyallyl isocyanurates, polyallyl alkyl isocyanurates, and polyallyl aromatic isocyanurates, and (C) from about 5 to about 100 parts by weight glass fiber; heating said mixture to a temperature whereby said mixture is in a state suitable for forming shapes; forming shapes by suitable shape-forming means; and subsequently irradiating said formed shapes at a dose level of at least 1.0 megarad.

7. The process of claim 6 wherein the heated mixture is formed into shapes by injection molding means.

8. The process of claim 6 wherein the heated mixture is formed into shapes by extrusion means.

9. The process of claim 6 wherein the heated mixture is formed into shapes by calendering means.

10. The process of claim 6 wherein the vinyl halide resin is polyvinyl chloride homopolymer.

11. The process of claim 6 wherein the polyfunctional unsaturated monomer is triallyl isocyanurate.

12. The process of claim 6 wherein the polyfunctional unsaturated monomer comprises a mixture of at least two of said monomers, one of which is diallyl phthalate, the other being selected from the group consisting of polyallyl isocyanurates, polyallyl alkyl isocyanurates, and polyallyl aromatic isocyanurates.

13. The process of claim 12 wherein the mixture comprises from about 10 to about 80 weight percent diallyl phthalate and about 90 to about 20 weight percent triallyl isocyanurate.

References Cited

UNITED STATES PATENTS

| | | | |
|---|---|---|---|
| 3,359,193 | 12/1967 | Pinnes | 204—159.17 |
| 3,312,757 | 4/1967 | McRitchie | 260—878 |

MURRAY TILLMAN, Primary Examiner

R. B. TURER, Assistant Examiner

U.S. Cl. X.R.

260—23, 41, 884, 899